April 26, 1966      A. K. GAYLORD      3,247,776

KITCHEN VENTILATING SYSTEM

Original Filed Sept. 21, 1962      4 Sheets-Sheet 1

INVENTOR.
ASA K. GAYLORD
BY
ATTORNEY

INVENTOR.
ASA K. GAYLORD
BY
ATTORNEY

April 26, 1966 A. K. GAYLORD 3,247,776
KITCHEN VENTILATING SYSTEM
Original Filed Sept. 21, 1962 4 Sheets-Sheet 3

INVENTOR.
ASA K. GAYLORD
BY
ATTORNEY

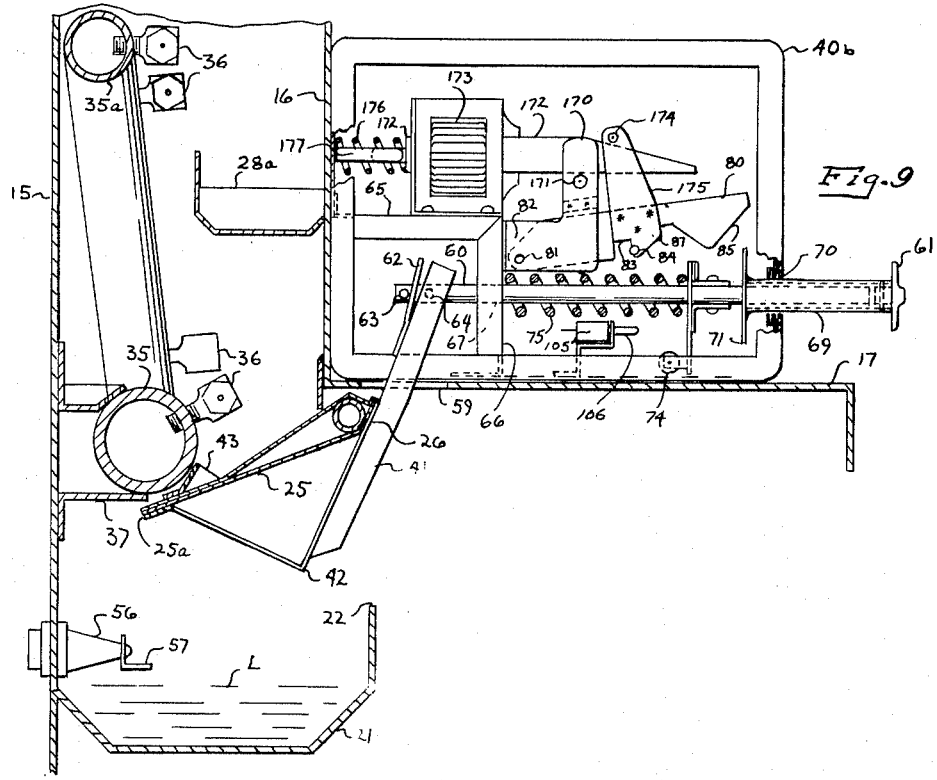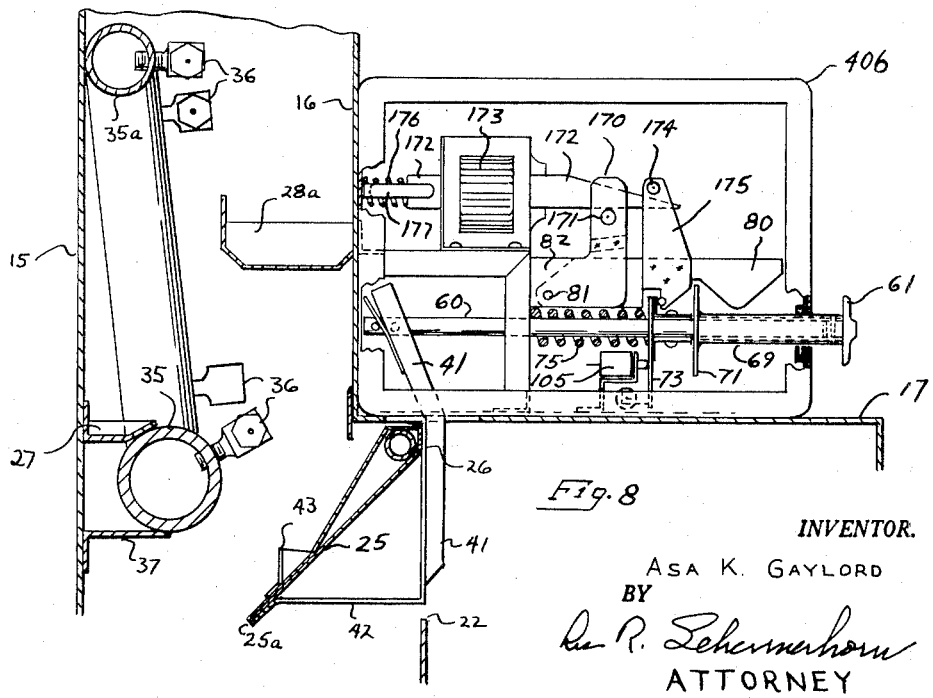

United States Patent Office 3,247,776
Patented Apr. 26, 1966

3,247,776
KITCHEN VENTILATING SYSTEM
Asa Kenneth Gaylord, 7424 SW. 25th Ave.,
Portland, Oreg.
Original application Sept. 21, 1962, Ser. No. 225,217.
Divided and this application May 17, 1965, Ser. No. 456,047
5 Claims. (Cl. 98—115)

This application is a division of my copending application, Serial No. 225,217, filed September 21, 1962.

This invention relates to a ventilator of the type having means for removing grease particles from the vapors and fumes emitted from cooking operations in a kitchen so that such grease will not condense and accumulate in the main ventilating ducts to create a fire hazard.

The ventilator is equipped with a plurality of grease extracting baffles which define a tortuous course for the air stream so that the grease droplets impinge upon the baffle surfaces and are thereby removed from the air stream. The baffles are arranged to drain the extracted condensation products into a main grease collecting trough or receptacle for convenient removal of the grease. Forced ventilation is maintained by an exhaust fan usually near the outlet of the duct and the inlet opening is usually equipped with some form of hood projecting at least partially over the various cooking devices to capture the vapors and fumes which may be emitted therefrom. A damper, which is preferably one of the baffles, is hinged to close the duct and stop the flow of air through the duct in case of fire.

The baffle section of the duct is also equipped with a piping system having nozzles directed toward the heaviest grease collecting surfaces on the baffles and duct walls. This piping system is connected with a source of steam or hot water to perform a dual purpose. The normal function of the nozzles is to provide sprays for washing down the grease laden surfaces periodically to keep them clean and free of combustible material. In case of fire the sprays are operated to serve a fire extinguishing purpose. By closing the damper to shut off the supply of oxygen and turning on the sprays, any fire in the duct is quickly smothered and any combustible grease is washed away. The piping system is preferably incorporated into the baffles themselves in order to heat the baffles and melt any grease congealed thereon and to avoid unnecessary obstructions to the flow of air.

The ventilator structure is adaptable to different types of kitchens and equipment and the different types of cooking operations performed in a kitchen. The hood and other details of construction may be of various types to best collect the vapors and fumes from fryers, broilers, deep fat fryers, ovens, soup kettles and the like. In some cases the cooking units are arranged along a wall, permitting the ventilating ducts to rise vertically. In some arrangements an overhead hood connects with horizontal ceiling ducts. Island installations may have a down draft duct which continues under the floor.

The present invention relates principally to control mechanisms for operating the damper and fluid sprays.

The objects of the invention are, therefore, to provide improved control and actuating mechanism and to provide an electrical fail-safe system which will not be disabled by power failure.

The invention will be better understood and the foregoing and other objects and advantages will become apparent from the following detailed description of certain preferred embodiments of the invention illustrated in the accompanying drawings. Various changes may be made, however, in the construction and arrangement of parts and certain features may be used without others. All such modifications within the scope of the appended claims are included in the invention.

In the drawings:

FIGURE 8 is a view similar to FIGURE 3 but showing a modified form of control mechanism to provide a fail-safe system, with the baffle damper in open position; and FIGURE 9 is a view similar to FIGURE 8 showing the baffle damper in closed position.

FIGURES 1 to 5

Figure 1:
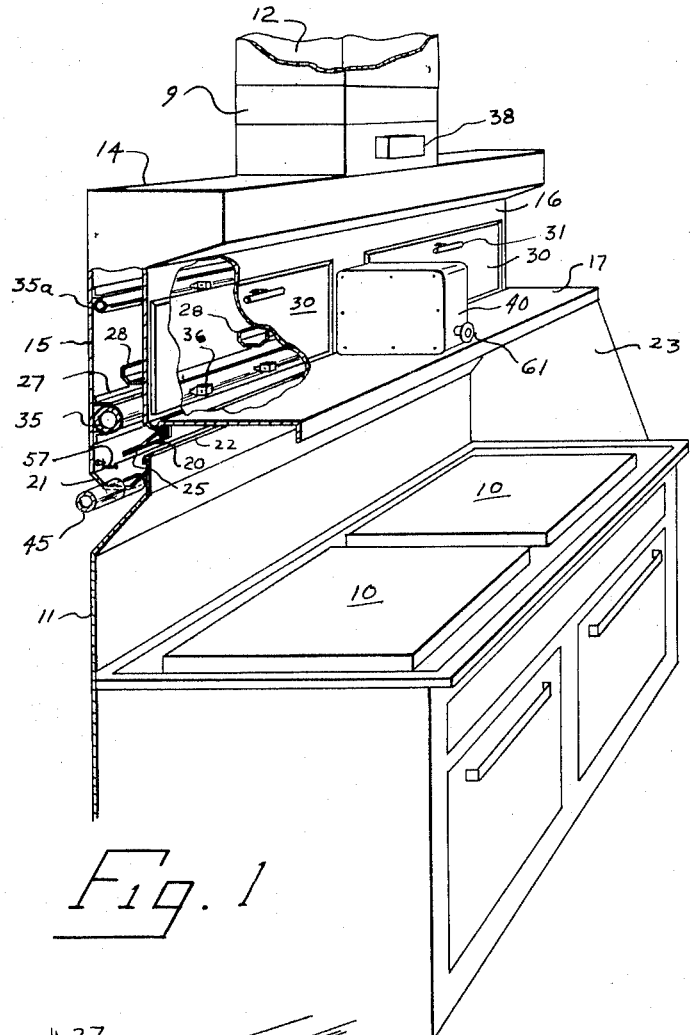
FIGURE 1 is a perspective view, with parts broken away, showing a wall mounted kitchen ventilating system embodying the principles of the invention.

FIGURE 1 illustrates a typical restaurant installation having a row of cooking units 10 projecting forward from a back wall 11. The upper ventilating duct 12 is ordinarily equipped with a fan for drawing a strong current of air through the duct to withdraw from the kitchen the smoke, fumes, steam, vapor and cooking odors produced by the cooking units 10. The duct also preferably contains an ozone generator 9 just above a lower portion 14 which spreads out laterally to embrace the whole length of the array of cooking units as they are disposed along the wall. This enlarged lower portion of the duct has a back wall 15 and a front wall 16 as well as end walls. Extending forward from the lower end of front wall 16 is a shelf 17 projecting outward over the cooking units and forming a part of a hood to intercept the smoke, vapors, etc.

Air is drawn into the ventilating duct through a narrow throat 20 between the bottom of shelf 17 and a grease trough receptacle 21 mounted on the back wall 15. Trough 21 has a forward lip 22 spaced a short distance below the under side of shelf 17 to define the lower edge of throat 20. The upper edge of this throat is defined by the under side of shelf 17 and the ends are defined by vertical end walls 23 which form the ends of the ventilator. One of the end walls 23 is omitted in FIGURE 1 to show the internal structure of the ventilator. The walls 11 and 23 and the shelf 17 thereby form a hood to cause all the smoke, fumes and cooking vapors from the cooking units 10 to be drawn into the narrow throat 20. After extraction of the condensation products, the air is expelled through the upper duct 12 into the outside atmosphere.

Figure 4:
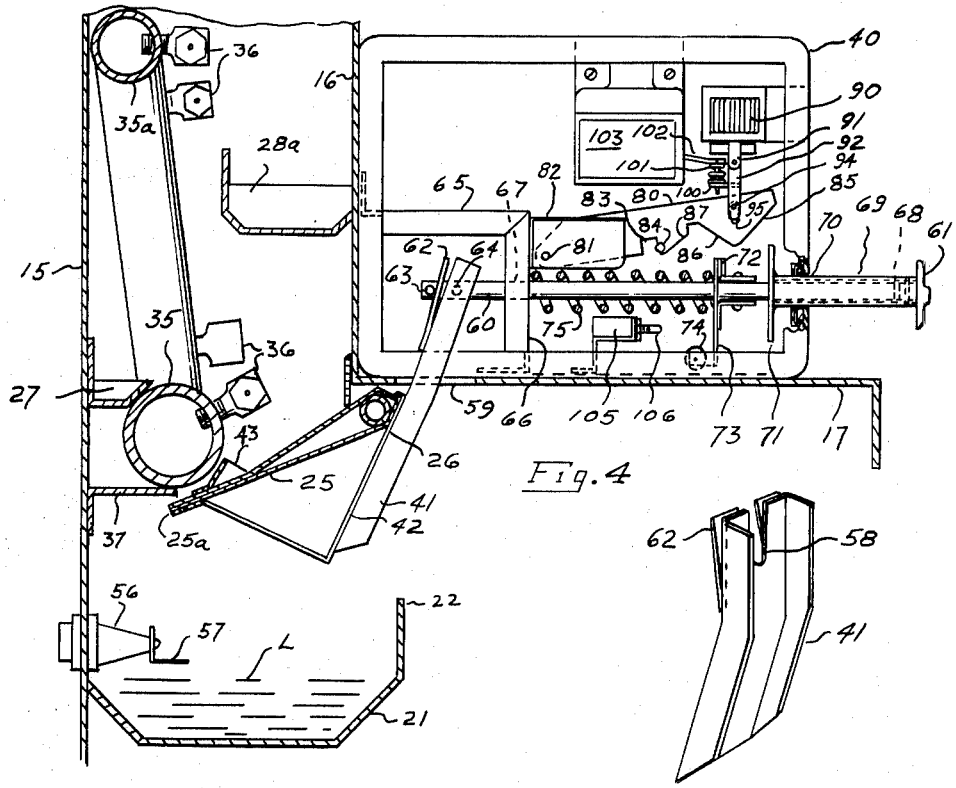
FIGURE 4 is a view similar to FIGURE 3 showing the baffle damper in closed position.
Figure 3:
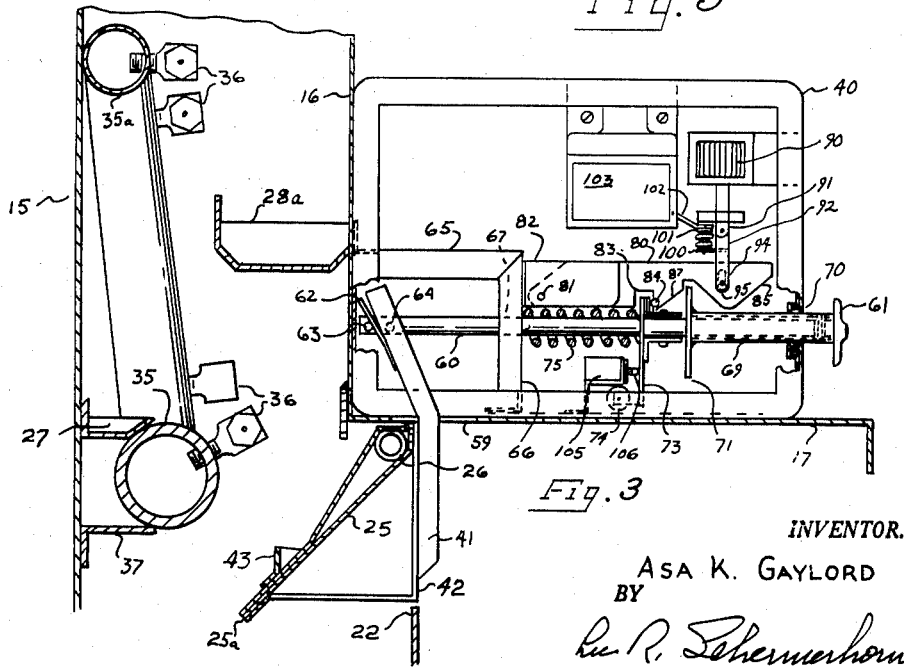
FIGURE 3 is an enlarged sectional view through the control box in FIGURE 1, showing the baffle in open position.

Air entering the throat 20 is deflected downward under the lower edge of a damper baffle 25 mounted on a shaft 26 supported on the under side of shelf 17 (see FIGURES 3 and 4). When the damper baffle is in open position as shown in FIGURES 1 and 3, its lower edge 25a depends downwardly substantially into the trough 21 approximately on the level of lip 22 although the edge 25a may be slightly above or slightly lower than lip 22. A fixed baffle trough 27 projects forwardly into the air passage from the back wall 15 immediately above the trough 21 and on the approximate level of shaft 26. The trough 21, damper baffle 25 and baffle trough 27 extend the full length of the throat 20. Baffle troughs 28 are mounted on hinged panels 30 having handles 31. These panels are retained in place by catches permitting each panel with its integral trough 28 to be easily opened out.

Incorporated into a baffle trough 27 is a spray pipe 35 having nozzle heads 36. Spray pipe 35 forms the projecting edge of the baffle trough, and, in the size relationship shown, forms the principal projecting part of the baffle for grease extracting purposes. Pipe 35 may be additionally supported by an underneath continuous sheet metal bracket 37, the pipe being spot welded to trough 27 and bracket 37 and the trough and bracket in turn being welded to the back wall 15. Above the baffle trough 28 is a second and smaller grease extracting baffle comprising a spray pipe 35a.

The numeral 38 in FIGURE 1 designates one or more temperature responsive switches preferably mounted in duct section 12 immediately above the upper transition portion of section 14. These switches are far enough from the cooking units so that they are not affected by the heat of the various cooking operations but do respond to high temperature in the ductwork to close electrical circuits to certain control mechanism presently to be described.

The numeral 40 generally designates a control box containing a damper operating mechanism which, in the present installation, is mounted in the middle of the length of shelf 17 to open and close the damper baffle 25 by means of a lever arm 41. In the region of arm 41 the trough 21 is shielded from the air flow by a plate 42 on the damper baffle 25 which meets lip 22 and closes a small portion of the throat 20 when the damper is closed as shown in FIGURE 3. The inner side of damper baffle 25 is equipped with a pair of gutters 43 which slope downwardly from opposite ends of the damper baffle to the center thereof, leaving a narrow drip gap between the lower ends of the two gutters. Products of condensation collected by the gutters 43 dip from the ends thereof immediately behind the shield plate 42 so that the draining material will drop freely into the trough 21 and not be picked up and carried upward by the relatively high velocity air stream entering the throat 20.

Similarly, the baffle troughs 27 and 28 slope toward a drain point or points which are shielded from the rising current of air. Pipe 35 is horizontal, however, and parallel with shaft 26 so that the lower edge of the damper baffle 25 may engage the under side of this pipe along the entire length of the damper baffle to close the duct against the entrance of air when the damper baffle is in its closed position, as shown in FIGURE 4. The primary purpose of baffle troughs 27 and 28, the former including pipe 35, is to provide a tortuous passage for the air stream in order to extract the objectionable products of condensation. A secondary purpose of troughs 27 and 28 is to collect such products of condensation flowing down the back and front walls 15 and 16 and convey them into the trough 21 without exposing them to the air stream in such a manner as to cause them to be carried up and deposited at higher levels in the ventilating duct.

FIGURE 4 also illustrates a grease level detector which may be provided when desired. The numeral 56 designates an insulator carrying an electrode 57 in the trough 21 just below the level of its front lip 22. When condensation materials accumulate in the trough 21 to a level L closely approaching the electrode 57, the change in capacitance between the trough and electrode produces a signal in the grease detector.

Figure 2:
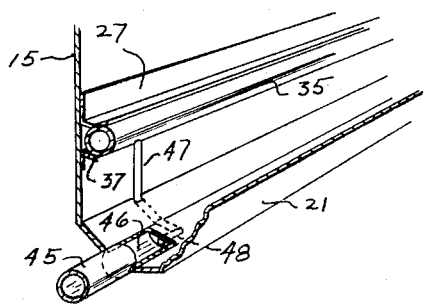
FIGURE 2 is an enlarged fragmentary perspective view of the drain end of the grease collecting trough shown in FIGURE 1.

FIGURE 2 shows a drain pipe 45 for draining the products of condensation from trough 21. This pipe communicates with a depression or sump 46 at the low end of the trough which preferably slopes throughout its length toward this point. A branch pipe 47 from the spray pipe 35 has an end 48 directed through the sump 46 and toward the open end of drain pipe 45 so that when pipe 35 is connected with a source of steam or hot water, a stream of such fluid from the pipe 47 will flush out the sump and drain pipe and also heat these parts to melt any congealed material therein.

Figure 5:
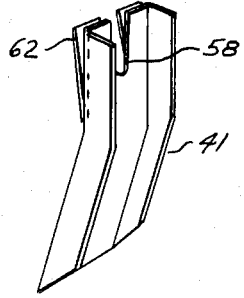
FIGURE 5 is a perspective view of the operating arm for the damper baffle in FIGURE 4.

FIGURES 3 and 4 illustrate the construction and operation of the mechanism in control box 40 for opening and closing the damper baffle 25. Lever 41 projects upwardly through slots 59 in the shelf 17 and the bottom wall of the control box for connection with a slide rod 60 having a manual operating handle 61. Lever 41 is channel-shaped in cross section with its web portion provided with a vertical slot 58 as shown in FIGURE 5 to receive the rod 60. Attached to the back side of this web portion is a similarly slotted spring tongue 62. A pivotal connection is effected between lever 41 and rod 60 by means of pins 63 and 64 in the rod, the former engaging tongue 62 and the latter engaging the inside of the channel web. This connection is enclosed in a chamber 65 having a front wall 66 provided with an opening 67 which forms a rear bearing support for the rod 60.

The front end of rod 60 terminates at 68 within a tube 69 forming a part of the handle 61. Tube 69 is supported for sliding movement in an opening at 70 through the front wall of the control box. This arrangement provides a telescopic lost motion connection between rod 60 and handle 61. Inward movement of the handle relative to rod 60 is limited by the inner end 68 of the rod, and outward movement of the handle from the front wall of box 40 is limited by a circular latch release plate 71 on the inner end of tube 69. Connected with the rod 60 is a catch plate 72 having a lower extension 73 equipped with a roller 74 to roll on the bottom wall of the box 40 and prevent the rod from rotating. The purpose of this is to maintain the pins 63 and 64 horizontal and at right angles to the lever 41 and to hold catch plate 72 upright. The rod 60 carries a compression spring 75 confined between the stationary wall 66 and latch plate 72. When the latch plate is released as shown in FIGURE 4, this spring holds the damper baffle in closed position with its lower edge bearing against the under side of pipe 35 of the baffle indicated generally at 27.

The damper baffle 25 is normally latched in open position as shown in FIGURE 3 by a latch bar 80 which is pivotally mounted on a pin 81 in a bracket 82 on the wall 66. The under side of the latch bar is provided with a notch 83 to receive the catch plate 72, the forward edge of this notch being equipped with a cylindrical bearing member 84 to reduce the release friction when the latch bar is lifted to disengage the catch plate. At its outer end the lower edge of the latch bar is provided with outer and inner cam faces 85 and 86 to cooperate with release plate 71. Another cam face 87 is disposed outward from the notch 83.

Mounted above the outer end of latch bar 80 is a solenoid 90 having a movable core or plunger 91 pivotally connected with a trip link 92. The lower end of trip link 92 is equipped with a pin 94 which extends through a vertical slot 95 in the latch bar. When damper baffle 25 is latched in open position as shown in FIGURE 3, energization of solenoid 90 will lift the latch bar 80 to disengage catch plate 72 and allow spring 75 to project rod 60 outward to close the damper baffle. Slot 95 allows the solenoid core to travel upward for a distance to gain momentum whereby pin 94 strikes the upper end of slot 95 with sufficient impact to overcome the static friction of catch plate 72 against the cylindrical bearing 84. This arrangement permits the use of a solenoid of relatively small size which would not have sufficient attractive force to lift the latch bar against frictional resistance of the catch plate in a steady pull.

The damper baffle may also be released to close by spring action from its FIGURE 3 position by merely pulling outward manually on the knob 61. The lost motion connection between knob 61 and rod 60 allows the knob to move outward relative to the rod so that release plate 71 will engage cam surface 86 to lift the latch bar. The damper baffle is manually opened from its FIGURE 4 position by merely pushing in on the handle 61. When the handle abuts the end 68 of bar 60, the bar 60 then moves inward with the handle until catch plate 72 becomes latched in the notch 83. During this inward movement solenoid 90 must be deenergized so that the latch bar rests in its lowermost position except as it is raised by release plate 71 passing along the cam surface 85 and catch plate 72 passing along the cam surface 87.

Armature link 92 is equipped with a switch-actuating finger 100. Finger 100 has a spring 101 arranged to lift the switch arm 102 of a switch 103 when solenoid 90 is energized. Mounted on the bottom of the box is a spring opening switch 105 having an actuating plunger 106 which is adapted to close the switch when the plunger is engaged by plate 73 as shown in FIGURE 3.

Figure 6:
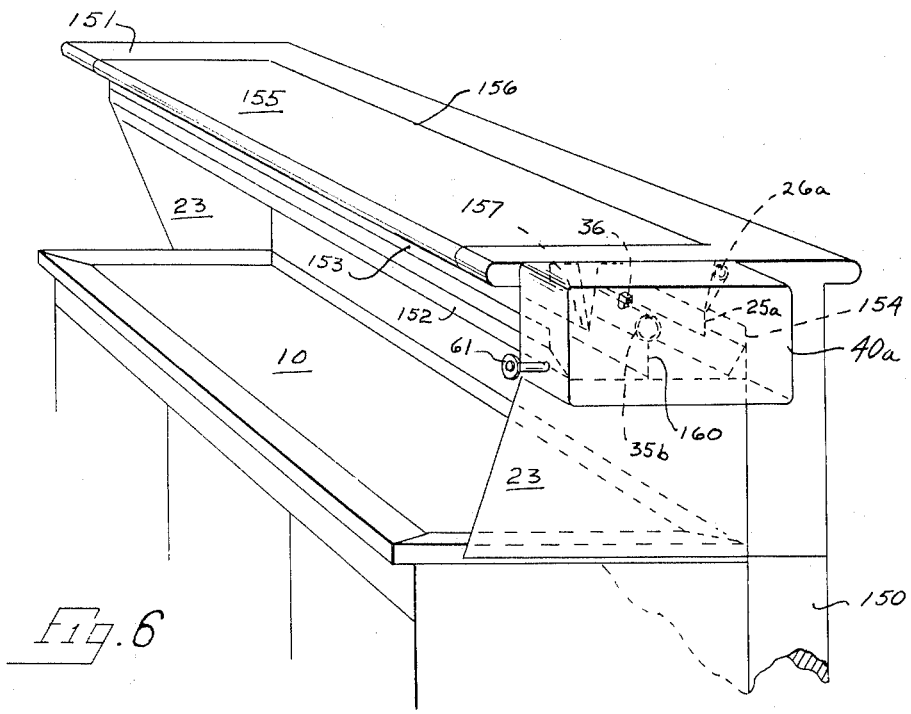
FIGURE 6 is a perspective view of an island installation showing a modified form of the baffle section for a down draft duct.
Figure 7:
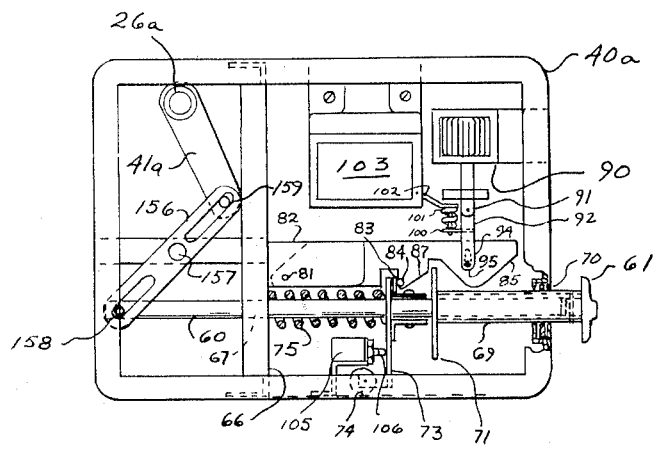
FIGURE 7 is an elevation view of the control box shown in FIGURE 6 with one side plate removed.

FIGURES 6 and 7

FIGURES 6 and 7 illustrate the application of the invention to an island-type installation having a downdraft ventilating duct. In this case the cooking unit or units 10 are ventilated by the downdraft duct 150 through which air is drawn by the usual suction fan. Over the cooking units the shelf 151 and end wings 23 form a hood similar to the shelf 17 and end wings 23 in FIGURE 1.

Underneath the shelf 151 is a grease collecting trough 152 with its forward edge or lip spaced a short distance beneath the shelf to form an inlet throat 153 for the cooking fumes and vapors. In order to place this inlet throat under the shelf, the front edge of trough 152 is preferably spaced behind the front edge of the shelf so that a substantial portion of the shelf overhangs the trough. The back edge of the trough is connected with the front wall 154 of the downdraft duct 150. The upper edge of wall 154 is spaced below the underside of shelf 151 to provide for the flow of the air stream through inlet throat 153, thence through the trough 152 and into the duct 150.

Preferably, the major portion of shelf 151 comprises a panel 155 which is hinged at its back edge 156 so as to lift up and provide access to the trough 152. The under side of this panel is equipped with a depending grease extracting baffle 157 which is spaced behind the inlet throat 153 and extends into, or substantially into, the trough 152. Behind the baffle 157 is a second grease extracting baffle 160 which is upstanding from the bottom of the trough 152. The upper edge of this baffle comprises a spray pipe 35b equipped with nozzles 36.

The shaft 26a of damper baffle 25a is mounted in suitable bearings on the under side of shelf 151 some distance behind the baffle 160. When this damper baffle is in open position as shown in FIGURE 6, the air stream is drawn in a circuitous path around the three baffles whereby grease droplets and other products of condensation are extracted from the air stream by the action of centrifugal force. The air stream after entering throat 153 is deflected downward around the lower edge of baffle 157 then upward across the upper edge of baffle 160 then again downward under the lower edge of baffle damper 25a and then upward over the upper edge of front duct wall 154 following which the air stream flows downward through duct 150 relatively free of all grease particles which might otherwise condense on the duct walls and create a fire hazard in the ventilator.

Nozzles 36 in FIGURE 6 are arranged to spray the baffles and the trough periodically with hot water or steam for the purpose of removing adhered grease so as to keep the parts clean and free of material which might constitute a fire hazard. Trough 152 is equipped with a drain, not shown, similar to the drain arrangement shown in FIGURES 1 and 2. The nozzles 36 also serve a fire estinguishing function as explained in connection with FIGURE 1, and for this purpose the damper baffle 25a is arranged to rotate counterclockwise in FIGURE 6 until it engages the duct wall 154 to close the entrance to the duct 150 and to keep any fire out of the main duct system.

The mechanism for operating damper baffle 25a is contained in a control box 40a similar to the control box 40 in FIGURES 1, 3 and 4. The essential difference is that the shaft 26a of the damper baffle and its operating arm 41a are positioned above the control rod 60 making it necessary to interconnect these two members with the slotted lever arm 156. Lever 156 is pivotally mounted at 157 for operation by a pin 158 in the inner end of rod 60. Similarly, the upper end of lever 156 is slotted to engage a pin 159 in the lower end of arm 41a. The view in FIGURE 7 is from the opposite side of the control box from that which appears in FIGURE 6, the damper baffle being in open position in both views. When latch bar 80 is raised either by pulling out on the manual knob 61 or by the energization of solenoid 90, the catch plate is released from notch 83 allowing spring 75 to push the rod 60 to the right in FIGURE 11, the same as in FIGURES 3 and 4. This swings the arm 41a and damper baffle 25a rearward and holds the damper baffle in firm engagement with the duct wall 154 as above described. In all other respects the control mechanism in FIGURE 7 operates the same as the control mechanism in FIGURES 3 and 4. The thermostats 38 may be located wherever desired in FIGURE 6.

FIGURES 8 and 9

FIGURES 8 to 9 illustrate a modification of the control mechanism and system to provide a fail-safe system. The damper baffle 25, control rod 60, manual knob 61 and latch bar 80 all operate the same as in FIGURES 3 and 4 but the solenoid trip mechanism is different. In this case the bracket 82 has a pair of upstanding legs 170 spanned by a pin and roller 171 to support the outer end of a wedge-shaped armature 172 in a horizontal solenoid 173. The nose of the armature is disposed under a similar pin and roller 174 in the upper end of a stirrup member 175 on the latch bar. Thus, the wedge end of the armature rides on roller 171 between the two legs of bracket 170 and passes between the two legs of stirrup member 175 with slight clearance below roller 174 when the armature is held in retracted position as shown in FIGURE 8 by the energization of solenoid 173.

A spring 176 is mounted on a guide pin 177 with the spring in compression between the back wall of the control box and the rear end of the armature. When the solenoid is deenergized, spring 176 thrusts the armature forward under the roller 174 to lift the latch bar and release the damper baffle to swing to closed position under the action of spring 75 as shown in FIGURE 9. As long as solenoid 173 remains deenergized, the damper baffle cannot be latched in open position. Latch bar 80 may be released manually by pulling out on knob 61 as in FIGURES 3 and 4, and the damper baffle may be closed after manual opening by pushing in on knob 61, provided solenoid 173 remains energized.

Thus, it is apparent that solenoid 173 must be kept energized to maintain the ventilating system in operation. In the event of electrical failure, the deenergization of this solenoid results in the release of armature 172 to its spring-actuated position shown in FIGURE 9 which releases the damper baffle 25 to closed position. This makes the ventilating system inoperative and thereby warns the personnel of the existence of a fault in the system.

The control mechanisms herein disclosed are not limited to baffle-type grease extractors. They are equally applicable to washable filters and any other grease extracting means employed in kitchen ventilators.

Having now described my invention and in what manner the same may be used, what I claim as new and desire to protect by Letters Patent is:

1. In a kitchen ventilator, a damper arranged to close and open the ventilator, spring means for closing said damper, a slidably mounted control rod having an inner end pivotally connected with the damper for opening the damper by inward sliding movement of the control rod, a tubular member telescopically mounted on the outer end of said control rod for relative sliding movement thereon, a knob on the outer end of said tubular member forming a stop engageable with the outer end of said control rod to limit the inward movement of said tubular member relative to said control rod, a catch projection on said control rod, a latch bar extending longitudinally above said control rod, said latch bar having a pivotally mounted inner end and having an outer end portion with a notch to engage said catch by gravity for holding the damper open against the closing force of said spring, a sloping cam surface on the outer end of said latch bar, a cam plate on said tubular member engageable with said cam surface by outward sliding movement of said tubular member on said control rod when said knob is pulled outward to lift said latch bar and release said catch so that said spring will close the damper causing said control rod to slide outward, said damper being opened by pushing said knob inward against the outer end of said control rod, and a solenoid having a reciprocal armature, and means operable by reciprocation of said armature in one direction to lift said latch bar to release position.

2. The structure defined in claim 1, said armature having upward vertical movement when the solenoid is energized and said means comprising a link between said armature and said latch bar to lift said latch bar when the solenoid is energized.

3. The structure defined in claim 1, including a spring for moving said armature in a direction to lift said latch bar to release position, said solenoid, when energized, moving said armature in the opposite direction to drop said latch bar into latching position.

4. The structure defined in claim 3, including a wedge-shaped end on said armature, a roller supporting the under side of said wedge end for lengthwise horizontal movement, and a roller connected with said latch bar engageable with a sloping surface on the upper side of said wedge end to lift said latch bar when said armature is projected by said armature spring.

5. The structure defined in claim 3, said armature having a sloping cam surface on one side thereof, and means on said latch bar engageable by said cam surface to lift the latch bar when said armature is moved by said armature spring.

References Cited by the Examiner

UNITED STATES PATENTS

| | | | |
|---|---|---|---|
| 2,813,477 | 11/1957 | Gaylord | 98—115 |
| 2,961,941 | 11/1960 | Graswich | 98—115 |
| 2,971,452 | 2/1961 | Graswich | 98—115 |

WILLIAM F. O'DEA, Primary Examiner.

JOHN F. O'CONNOR, Assistant Examiner.